(12) United States Patent
Nicholson et al.

(10) Patent No.: US 10,795,432 B1
(45) Date of Patent: Oct. 6, 2020

(54) MAINTAINING VIRTUAL OBJECT LOCATION

(71) Applicant: Lenovo (Singapore) Pte. Ltd., Singapore (SG)

(72) Inventors: John Weldon Nicholson, Cary, NC (US); Howard Locker, Cary, NC (US); Daryl Cromer, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 8 days.

(21) Appl. No.: 16/368,295

(22) Filed: Mar. 28, 2019

(51) Int. Cl.
    *G06F 3/01*     (2006.01)
    *G06T 19/00*     (2011.01)

(52) U.S. Cl.
    CPC .......... *G06F 3/012* (2013.01); *G06T 19/006* (2013.01); *G06T 2219/024* (2013.01)

(58) Field of Classification Search
None
See application file for complete search history.

(56) References Cited

U.S. PATENT DOCUMENTS

| | | | | |
|---|---|---|---|---|
| 2013/0331130 | A1* | 12/2013 | Lee | A61K 31/4535 455/457 |
| 2015/0149285 | A1* | 5/2015 | Schroeter | G06Q 30/0261 705/14.58 |
| 2015/0215892 | A1* | 7/2015 | Teng | G01S 5/0226 455/456.1 |
| 2017/0180938 | A1* | 6/2017 | Smith | H04W 4/025 |
| 2018/0075623 | A1* | 3/2018 | Hwang | G09G 2300/026 |

* cited by examiner

*Primary Examiner* — Frank S Chen
(74) *Attorney, Agent, or Firm* — Ference & Associates LLC

(57) ABSTRACT

One embodiment provides a method, including: determining, using a processor, a location of a virtual object within a physical environment with respect to a user having a headset; generating, on a display of the headset of the user, an augmented reality scene of the physical environment having the virtual object; and maintaining, within the augmented reality scene and as the user moves throughout the physical environment, the location of the virtual object, wherein the maintaining comprises identifying a position of the user with respect to other users each having headsets. Other aspects are described and claimed.

20 Claims, 3 Drawing Sheets

MAINTAINING VIRTUAL OBJECT LOCATION

BACKGROUND

Virtual and augmented reality headset use is becoming more commonplace for previewing and building scenes. For example, the use of these headsets may provide a user with the ability to build a virtual scene from scratch, preview virtual items within a physical environment, provide information regarding an item in a physical environment, and the like. Virtual reality headsets support completely virtual scenes (e.g., a scene completely computer generated and provided on the display of the headset), while augmented reality headsets may augment a physical environment with virtual features (e.g., the user can see the physical environment having virtual objects on the display of the headset).

BRIEF SUMMARY

In summary, one aspect provides a method, comprising: determining, using a processor, a location of a virtual object within a physical environment with respect to a user having a headset; generating, on a display of the headset of the user, an augmented reality scene of the physical environment having the virtual object; and maintaining, within the augmented reality scene and as the user moves throughout the physical environment, the location of the virtual object, wherein the maintaining comprises identifying a position of the user with respect to other users each having headsets.

Another aspect provides an information handling device, comprising: a processor; a memory device that stores instructions executable by the processor to: determine, using a processor, a location of a virtual object within a physical environment with respect to a user having a headset; generate, on a display of the headset of the user, an augmented reality scene of the physical environment having the virtual object; and maintain, within the augmented reality scene and as the user moves throughout the physical environment, the location of the virtual object, wherein the instructions to maintain comprise instructions to identify a position of the user with respect to other users each having headsets.

A further aspect provides a product, comprising: a storage device that stores code, the code being executable by a processor and comprising: code that determines, using a processor, a location of a virtual object within a physical environment with respect to a user having a headset; code that generates, on a display of the headset of the user, an augmented reality scene of the physical environment having the virtual object; and code that maintains, within the augmented reality scene and as the user moves throughout the physical environment, the location of the virtual object, wherein the code that maintains comprises code that identifies a position of the user with respect to other users each having headsets.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
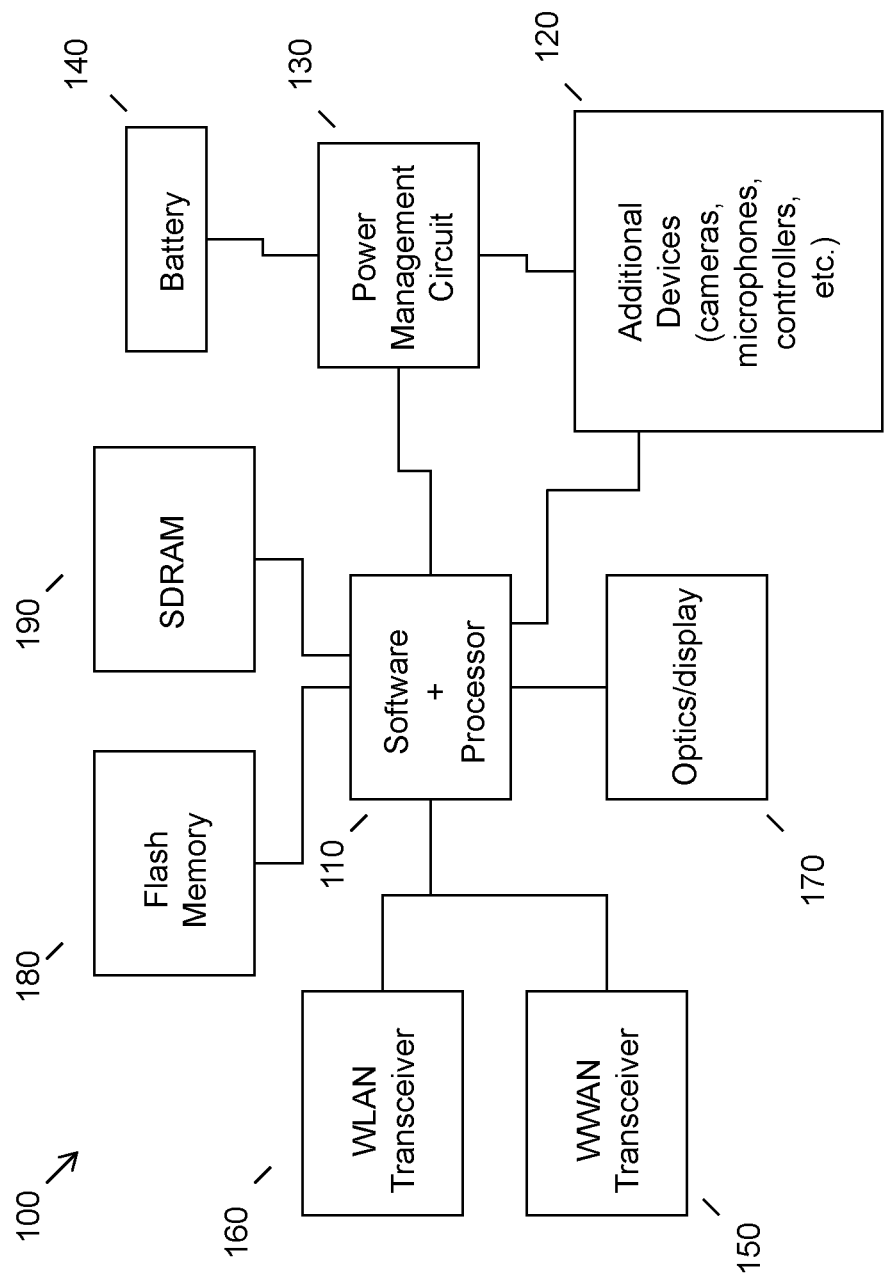
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

To render a virtual image or object in a scene utilizing information provided by a physical environment, augmented reality and virtual reality (AR/VR) headsets commonly use inside-out tracking. Inside-out tracking utilizes sensors (e.g., cameras) attached directly to a video or reality headset to capture external information related to the physical environment. The sensors attached to the headset are used to sense the physical environment a user is within and to determine how a user's position changes in relation to the physical environment. Thus, if the scene provided on the AR/VR headset, utilizing inside-out tracking, includes a virtual object, for example, on another object, as the user moves around the physical environment, the virtual object may be redrawn in the same location making it appears to the user that the virtual object is not moving, even though the user's position has changed.

This conventional technique of using inside-out tracking may permit a virtual object to remain in a designated location as a user moves around a physical environment. However, when utilizing cameras for inside-out tracking the physical environment has to have enough light and/or visual markers. If a physical environment does not contain adequate light or visual markers, the inside-out tracking may not be able to accurately determine a user's location because the features in the physical environment cannot be seen and therefore cannot be used as reference points for drawing of the virtual object.

Another conventional method that an AR/VR device may use to determine user location within a physical environment is a fixed tracking method. Fixed tracking may use external sensors to capture and provide information to the user headset. In other words, sensors or cameras at a location other than on the headset may be used to track the headset, or lights or markers on the headset, and, therefore, track the user within the physical environment. Also known as Outside-In tracking, fixed tracking may utilize information pertaining to specific features of a physical environment. For example, since the sensors are external and stationary, the location of features within the physical environment will remain constant as a user moves throughout the physical environment.

For example, the system may use the stationary camera to provide information describing the exact location of features within the physical environment (e.g., objects, room dimensions, etc.) as well as describing the location of the features in relation to other room features (e.g., distance from walls, distance from a couch, and distance from a bookcase). Thus, as the user moves through the physical environment, the system can use these known features and information regarding the features to determine where the user is within the environment, and, therefore, how virtual objects should be drawn on the headset. Such a system includes multiple stationary cameras as well as an AR/VR headset making these systems expensive, a nuisance to set up and take down, and processing resource extensive.

Accordingly, an embodiment provides a method for maintaining a location of a virtual object in a physical environment on a headset device using positions of other users within the physical environment. An embodiment determines a location of a virtual object within a physical environment with respect to the user wearing a headset. For example, the user may choose where a virtual object may be located with respect to the physical environment, for example, a user may place a virtual vase on top of physical table present in the physical environment. Since this type of virtual object would not normally move on its own, this chosen location for the virtual object needs to appear to remain, even as the user moves through the environment, unless, or until, some trigger causes it to change.

An embodiment may then generate or render an augmented reality scene on the display of the headset including the physical environment and the virtual object at the designated location (e.g., virtual vase on table). Sensors coupled to the user headset (e.g., sensors on the headset, sensors within the environment, etc.) may capture information related to the physical environment. In an embodiment, if a user remains stationary, information provided by the sensors may be minimal. However, as the user wearing the headset moves around a physical environment, information regarding user position, which then affects virtual object position, may be continually received to accurately depict the virtual object. Specifically, the virtual object needs to maintain its location and orientation so that the perception of the virtual object by the user changes as the user moves around. Using the example mentioned above, if a user walks around the vase, the user should see different angles or sides of the vase. However, it should appear that the vase has not moved from the location on the table. Thus, an embodiment may maintain the virtual object location.

Unlike traditional methods that use inside-out tracking or outside-in tracking, the described system may identify a position of a user within a physical environment by identifying the position of the user in relation to other users wearing headsets in the physical environment. It should be understood that the conventional techniques of inside-out tracking and outside-in tracking may be used to augment position information received from other users. Thus, the described system provides a more accurate and efficient system than conventional techniques. Specifically, the described system allows for tracking a user even in environments having low light or a low number of markers (i.e., one of the drawbacks of conventional inside-out tracking systems) and the system does not require multiple expensive fixed cameras, does not have time-consuming setup and take down, and does not require the very processing resource extensive algorithms of outside-in tracking systems.

The illustrated example embodiments will be best understood by reference to the figures. The following description is intended only by way of example, and simply illustrates certain example embodiments.

While various other circuits, circuitry or components may be utilized in information handling devices, with regard to VR or AR 100, an example illustrated in FIG. 1 includes a system on a chip design found for example in VR or AR mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, AR or VR controller, other input devices, etc. System 100 often includes one or more optics or displays (e.g., heads-up display, headset display, etc.) 170 for data input and display/rendering. System 100 also typically includes various memory devices, for example flash memory 180 and SDRAM 190.

Figure 2:
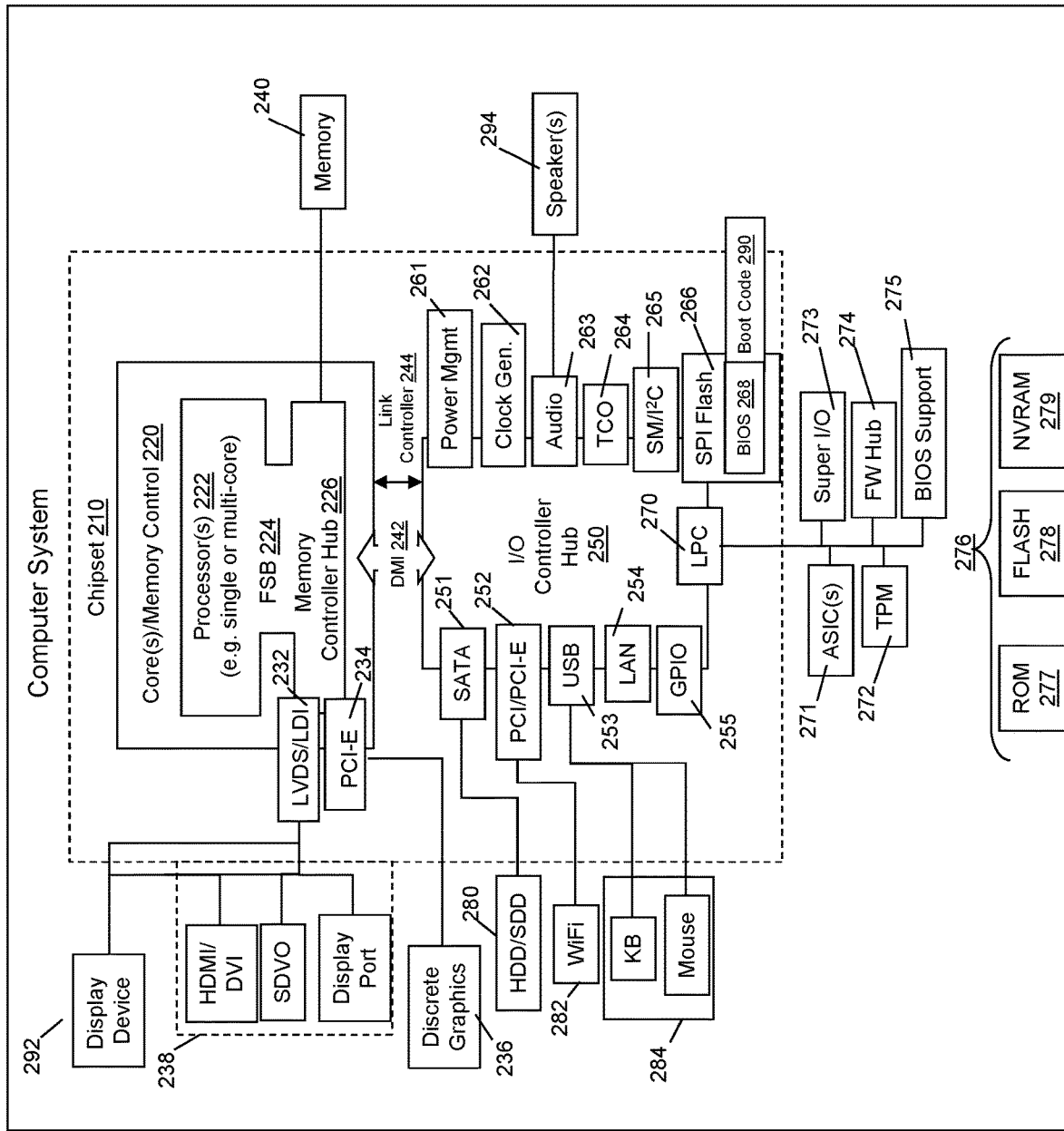
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, personal computer devices generally, and/or other electronic devices that may be capable of generating, rendering, and/or displaying AR or VR scenes. For example, the circuitry outlined in FIG. 1 may be implemented in an AR or VR headset device, whereas the circuitry outlined in FIG. 2 may be implemented in a laptop or other information handling device that may be used in conjunction with the AR or VR headset for processing, generating, or otherwise processing the AR or VR scene.

Figure 3:
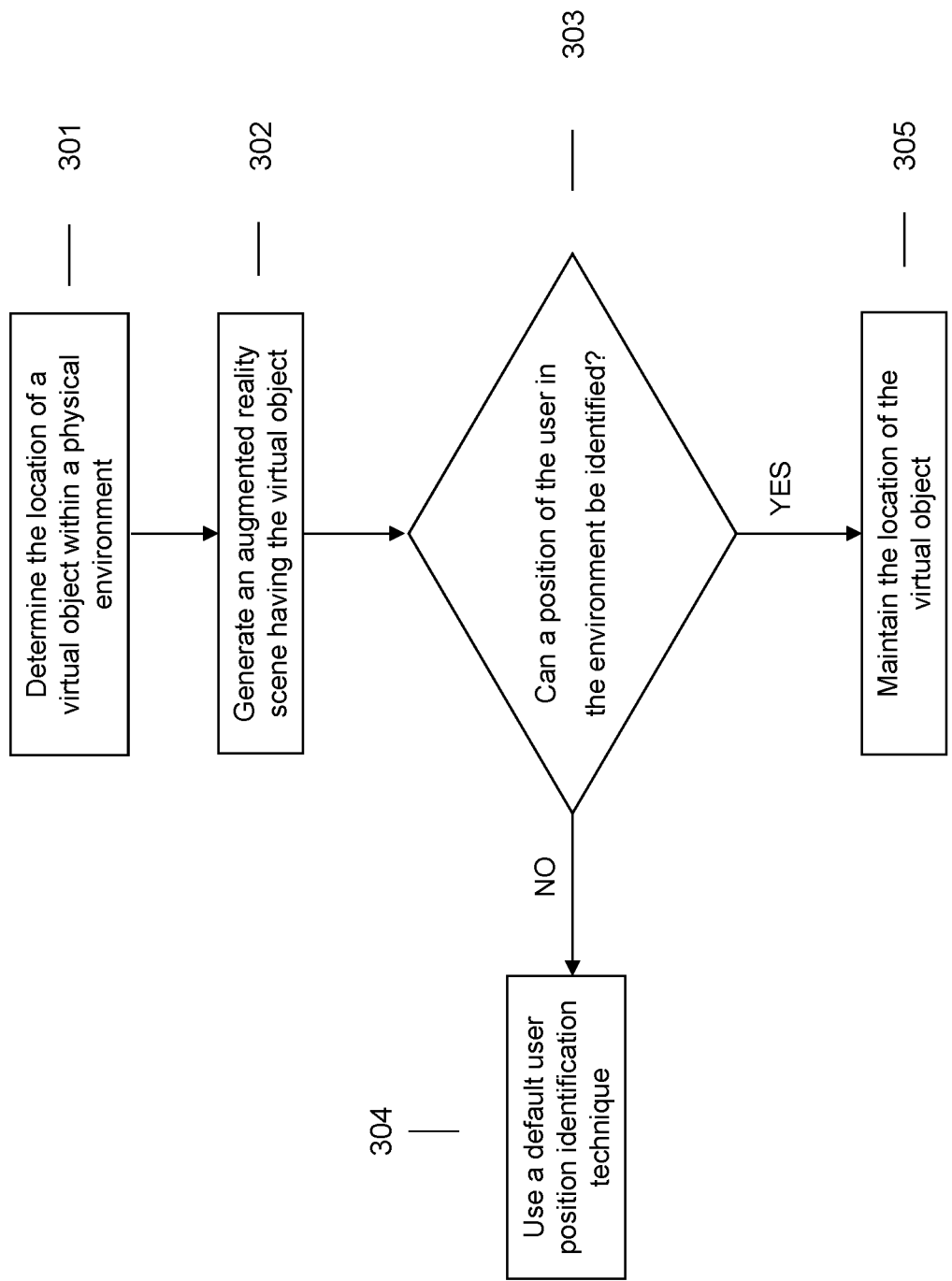
FIG. 3 illustrates an example method of maintaining a location of a virtual object in a physical environment on a headset device using positions of other users within the physical environment.

Referring now to FIG. 3, an embodiment may maintain a location of a virtual object in a physical environment on a headset device using positions of other users within the physical environment. At 301, an embodiment may determine the location of the virtual object within a physical environment with respect to a user having a headset. The user may be utilizing a video or virtual headset (e.g., augmented reality headset, virtual reality headset, etc.). To determine the location of the virtual object, an embodiment may receive input from a user identifying where the virtual object should be placed within a generated scene with respect to a physical object. For example, a user (e.g., the user utilizing the headset, a user programming the scene, etc.) may elect to place a virtual object on, around, or in a physical object present in a physical environment. For example, a user may elect to place a virtual vase on a physical table in living room. The physical object does not have to be a movable or protruding physical object, for example, a tree, table, fence, car, or the like. In other words, the physical object may include the floor, wall, ceiling, ground, or the like, of the physical environment.

Thus, an embodiment may identify a physical object within the physical environment that the virtual object should be virtually attached or pinned to. In other words, an embodiment may determine an anchor point (e.g., the physical object) for the virtual object. Additionally, the virtual object may be virtually attached to other virtual objects that are virtually attached to a physical object. For example, the virtual vase may include virtual flowers. Rather than virtually attaching the virtual flowers to the table, an embodiment may virtually attach the virtual flowers to the virtual vase, which is virtually attached to the physical table.

After a location of the virtual image in the physical environment has been established, an embodiment may generate and render, at 302, an augmented reality scene including the virtual object and the physical environment. As stated before, the physical environment may be the physical location and the features of the physical location that the user is currently within. Thus, generating the augmented reality scene may include combining information related to both virtual objects and the physical environment. Rendering the scene may include providing the scene on the display portion of the headset of the user. Generation or rendering of the augmented reality scene on the headset of the user may be performed using conventional scene generation and rendering techniques.

Once the augmented reality scene has been generated and rendered on the headset, an embodiment needs to maintain the location of the virtual object with respect to the physical object within the scene, even when the user moves around the environment which causes the scene to change on the display. Thus, an embodiment may determine whether a position of a user within the physical environment can be identified at 303. In other words, as the user moves around the physical environment, the scene being displayed on the headset should change to account for this movement. This scene change provides the user with the feeling that he/she is actually within the environment and viewing objects within the environment, even if the environment or objects within the environment are virtual objects. Accordingly, as the user moves throughout the environment, the perspective of objects should change, different objects may come into view, objects that are currently visible may no longer be visible, and the like. However, what should not change is the location of objects with respect to other objects. For example, a vase on a table should not change locations on the table or move to a completely different location. Additionally, as the user moves around the vase, the user should see different angles and features of the vase instead of the same view of the vase. Accordingly, the user's position within the environment must be tracked in order to correctly generate and render the scene.

Since the system already knows where the physical objects within the environment are and the positions of these objects with respect to other objects, the system can maintain the relative positions of these objects with respect to the other objects. This is also true of the virtual objects with respect to the physical objects. However, in order to provide the correct scene perception to the user, an embodiment must identify the position of the user with respect to each of these objects. To identify the position of the user an embodiment may use the position of other users each having headsets. Thus, unlike conventional systems which require the use of physical features within the physical environment to track the movement of the user, the described systems and methods can track the movement of the user through other users.

In an embodiment, other users having or wearing video or virtual headsets may be present in the physical environment. As would be expected, the other users present in a physical environment may be seen by a user in the generated augmented reality scene. Location information regarding where each user is in a scene may be shared throughout a system, and the locations of the users may be used as reference points in a system. Sharing user location information, as well as location information regarding features in a physical environment, may allow a system to calculate the exact location of a user within the physical environment, or the absolute position. For example, if a distance and direction is known describing a relation of user to a table, and the same are known describing a relation of a user to a chair, the absolute position of a user may be calculated. The absolute position of a user is the position of the user within the physical environment.

In order to identify the position of the user as the user moves throughout the environment without referencing an absolute known position of a physical feature, as in conventional techniques, an embodiment may identify the position of the user with respect to other users. Since the position of the other users may also change, the position of the user is a relative position, or a position relative to another object having an unknown absolute position. Thus, in order to determine the position, including orientation, of the user with respect to the other users, the headsets associated with both the original user and each of the other users may include at least one sensor or receiver and emitter. The emitter outputs a signal that can be received by the at least one sensor or receiver. In an embodiment, the emitters located on the user headsets may produce emitter patterns which may be captured by the other headsets. These emitter patterns may be used to track the user with respect to the other users. In an embodiment, since the physical environment may have low-to-no light, the use of infrared technology may be employed. Infrared wavelengths may be detectable by a sensor or receiver even in low-to-no light situations.

The emitter patterns may be used to determine the position of the user with respect to the other user using one or more algorithms. For example, an embodiment may utilize time-of-flight calculations, time-of-arrival calculations, angle-of-arrival calculations, time-difference-of-arrival, or any other algorithm that can use signals to identify a distance or position. The above described algorithms use times associated with the signals to determine a distance and direction of one reference point to another. For example, in a time-difference-of-arrival calculation a system identifies when one signal was received at one receiver and when the signal was received at another transmitter. Based upon the delay between receipt of the signals, the system can essentially use a triangulation technique to determine a location of the device sending the signal with respect to the device receiving the signal, therefore, determining a relative position of the first device to the second device. Thus, using the sensors located on the headsets to transmit a signal between headsets allow an embodiment to determine the relative position of the user with respect to other users, and, therefore, determine the position of the user with respect to the physical and virtual objects in the scene.

In other words, utilizing distance and direction information of other users relative to a target user, an embodiment may calculate the relative position of the user with respect to the other users. The relative position of the user with respect to the other users may then be used by the system to determine the relative position, including orientation, of the user with respect to both physical objects and the virtual objects being generated and rendered on the display screen of the headset. Thus, the described system may utilize moving objects (e.g., users) as features to identify the relative position of a user within the physical environment, and, thereby, identify the position of virtual objects within the scene.

To complement or augment the tracking of the user through the use of other users, an embodiment may employ information from other sensors or other techniques. For example, in one embodiment inertial information may be received from either the target user's headset or any of the other user's headsets. This information can provide information related to whether the user or other users are moving. This may then be used by the system to further refine or adjust the identification of the position of the user. As another example, an embodiment may also use traditional techniques, for example, inside-out tracking and outside-in tracking. The information obtained from these traditional techniques may be used by an embodiment to further refine the tracking information identified from the use of other users.

At 303, if a system is not able to identify a position of the user with respect to other users, an embodiment may employ conventional techniques for identifying the position of the user, such as inside-out tracking or outside-in tracking, at 304. If, however, an embodiment is able to identify the positon of a user in a physical environment at 303, an embodiment may maintain the location of the virtual object based upon the identified position of the user. In other words, using the position of the user as determined from the position of other users, an embodiment can maintain the location of the object within the scene that is generated and rendered on the headset of the user. Stated differently, using the position of the user, an embodiment may virtually hold the virtual object to the physical object where the virtual object was originally positioned at 301. The maintaining of the location of the virtual object may occur in "real-time" as the user moves around the physical environment. Thus, an embodiment may continually update the scene in order to consistently display a virtual object in the correct location as the user moves. In other words, upon determining the relative position of the users with respect to the other users, the users may be utilized as features for generating and rendering the augmented reality scene and, thereby, maintaining the location of virtual objects within the scene.

The various embodiments described herein thus represent a technical improvement to conventional AV/VR headset scene rendering. Rather than using conventional inside-out or outside-in tracking techniques, the described system and method provide a technique for tracking a user within a physical environment by determining the position of the user in relation to other users. Thus, the system can be used in physical environments that have low light or a small number of visual markers, which are required by the inside-out tracking technique. Additionally, the system does not require expensive fixed cameras or sensors to be mounted within the physical environment, which is a requirement of outside-in tracking techniques. Thus, the described system and method provides for accurate user position tracking so that scenes can be rendered accurately as with the conventional techniques, but without requiring many additional features, sensors, devices, and the like, which are required by the conventional techniques, making the described system and method more cost-effective, less processing resource extensive, and just as accurate as the conventional systems.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   determining, using a processor, a location of a virtual object within a physical environment with respect to a user having a headset;
   generating, on a display of the headset of the user, an augmented reality scene of the physical environment having the virtual object; and
   maintaining, within the augmented reality scene and as the user moves throughout the physical environment, the location of the virtual object, wherein the maintaining comprises identifying a position of the user with respect to other users each having headsets.

2. The method of claim 1, wherein each of the headsets of the other users and the headset of the user comprise at least one emitter.

3. The method of claim 2, wherein the identifying a position comprises tracking the user with respect to the other users using a pattern emitted from at least one of the emitters of at least one other user.

4. The method of claim 1, wherein the maintaining comprises using the position of the user with respect to the other users to determine a position of the virtual object with respect to the user.

5. The method of claim 1, wherein the identifying a position comprises identifying a relative position of the user with respect to the other users.

6. The method of claim 1, wherein the identifying a position comprises identifying an orientation of the user with respect to the other users.

7. The method of claim 1, wherein the identifying a position comprises receiving inertial information from at least one of: one of the headsets of the other users and the headset of the user.

8. The method of claim 7, wherein the identifying a position further comprises adjusting the identified position based upon the inertial information.

9. The method of claim 1, wherein the identifying a position comprises treating the other users as features for tracking the user within the physical environment.

10. The method of claim 1, wherein the determining a location comprises identifying a physical object within the physical environment to virtually attach the virtual object to and wherein the maintaining comprises virtually holding the virtual object to the physical object.

11. An information handling device, comprising:
a processor;
a memory device that stores instructions executable by the processor to:
determine, using a processor, a location of a virtual object within a physical environment with respect to a user having a headset;
generate, on a display of the headset of the user, an augmented reality scene of the physical environment having the virtual object; and
maintain, within the augmented reality scene and as the user moves throughout the physical environment, the location of the virtual object, wherein the instructions to maintain comprise instructions to identify a position of the user with respect to other users each having headsets.

12. The information handling device of claim 11, wherein each of the headsets of the other users and the headset of the user comprise at least one emitter.

13. The information handling device of claim 12, wherein the instructions to identify a position comprises instructions to track the user with respect to the other users using a pattern emitted from at least one of the emitters of at least one other user.

14. The information handling device of claim 11, wherein the instructions to maintain comprise instructions for using the position of the user with respect to the other users to determine a position of the virtual object with respect to the user.

15. The information handling device of claim 11, wherein the instructions to identify a position comprise instructions to identify a relative position of the user with respect to the other users.

16. The information handling device of claim 11, wherein the instructions to identify a position comprise instructions to identify an orientation of the user with respect to the other users.

17. The information handling device of claim 11, wherein the instructions to identify a position comprise instructions to receive inertial information from at least one of: one of the headsets of the other users and the headset of the user.

18. The information handling device of claim 17, wherein the instructions to identify a position further comprise instructions to adjust the identified position based upon the inertial information.

19. The information handling device of claim 11, wherein the instructions to identify a position comprise instructions to treat the other users as features for tracking the user within the physical environment.

20. A product, comprising:
a storage device that stores code, the code being executable by a processor and comprising:
code that determines, using a processor, a location of a virtual object within a physical environment with respect to a user having a headset;
code that generates, on a display of the headset of the user, an augmented reality scene of the physical environment having the virtual object; and
code that maintains, within the augmented reality scene and as the user moves throughout the physical environment, the location of the virtual object, wherein the code that maintains comprises code that identifies a position of the user with respect to other users each having headsets.

* * * * *